(12) United States Patent
Collina et al.

(10) Patent No.: US 8,940,653 B2
(45) Date of Patent: Jan. 27, 2015

(54) MAGNESIUM DICHLORIDE-ALCOHOL ADDUCTS AND CATALYST COMPONENTS OBTAINED THEREFROM

(75) Inventors: Gianni Collina, Ferrara (IT); Daniele Evangelisti, Ferrara (IT); Benedetta Gaddi, Ferrara (IT); Anna Fait, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 120 days.

(21) Appl. No.: 13/876,806

(22) PCT Filed: Sep. 29, 2011

(86) PCT No.: PCT/EP2011/066956
§ 371 (c)(1),
(2), (4) Date: Mar. 28, 2013

(87) PCT Pub. No.: WO2012/041944
PCT Pub. Date: Apr. 5, 2012

(65) Prior Publication Data
US 2013/0197172 A1    Aug. 1, 2013

Related U.S. Application Data

(60) Provisional application No. 61/404,518, filed on Oct. 5, 2010.

(30) Foreign Application Priority Data

Sep. 30, 2010   (EP) .................... 10183309

(51) Int. Cl.
*B01J 31/00*   (2006.01)
*B01J 37/00*   (2006.01)
*C08F 4/02*   (2006.01)
*C08F 4/60*   (2006.01)
*C08F 2/00*   (2006.01)
*C08F 4/10*   (2006.01)
*C08F 10/00*   (2006.01)
*C08F 10/06*   (2006.01)
*C08F 110/06*   (2006.01)

(52) U.S. Cl.
CPC . *C08F 4/10* (2013.01); *C08F 10/00* (2013.01); *C08F 10/06* (2013.01); *C08F 110/06* (2013.01)
USPC ........... 502/125; 502/170; 502/172; 526/213; 526/210; 526/212

(58) Field of Classification Search
CPC ............. B01J 31/00; B01J 37/00; C08F 4/02; C08F 4/60; C08F 2/00
USPC .................... 502/125, 170; 526/213
See application file for complete search history.

(56) References Cited

U.S. PATENT DOCUMENTS 4,612,299 A    9/1986   Arzoumanidis et al.
6,730,627 B1   5/2004   Masi et al.
2006/0025300 A1*   2/2006   Diego et al. ............. 502/115

OTHER PUBLICATIONS

PCT International Search Report & Written Opinion mailed Dec. 23, 2011, for PCT/EP2011/066956.
"Magnesium Stearate Based Titanium Catalyst Systems for Propene Polymerization" Virendra Kumar Gupta, Makromolekulare Chemie, vol. 193, No. 5, May 1, 1992.

* cited by examiner

*Primary Examiner* — David W Wu
*Assistant Examiner* — Elizabeth Eng

(57) ABSTRACT

Adducts comprising a $MgCl_2$, an alcohol ROH in which R is a C1-C10 hydrocarbon group, present in a molar ratio with $MgCl_2$ ranging from 0.5 to 5 and less than 15% wt, based on the total weight of the adduct, of a metal salt of an aliphatic carboxylic acid having from 8 to 22 carbon atoms.

15 Claims, No Drawings

MAGNESIUM DICHLORIDE-ALCOHOL ADDUCTS AND CATALYST COMPONENTS OBTAINED THEREFROM

This application is the U.S. National Phase of PCT International Application PCT/EP2011/066956, filed Sep. 29, 2011, claiming priority of European Patent Application No. 10183309.3, filed Sep. 30, 2010 and the benefit under 35 U.S.C. 119(e) of U.S. Provisional Application No. 61/404,518, filed Oct. 5, 2010, the contents of which are incorporated herein by reference in their entirety.

The present invention relates to magnesium dichloride/alcohol adducts containing specific amounts of long chain aliphatic carboxylic acids or metal salts thereof. The adducts of the present invention are particularly useful as precursors in the preparation of catalyst components for the polymerization of olefins having reduced particle size and/or narrow particle size dispersion.

The use of polymerization catalysts having reduced particle size is increasingly requested in certain polymerization technologies, particularly in slurry polymerization. In fact, when transporting a solid particle in a liquid flow, for example in vertical upward direction, the efficiency of the transport depends on the properties of the liquid and of the solid particle. Considering a spherical particle being transported in an upward flowing liquid stream, the difference in velocity between the liquid and the solid particle (the 'slip-velocity') in this case is equal to the so-called 'terminal velocity' of that particle. The terminal velocity $V_t$ is defined by the following formula:

$$V_t = \sqrt{\frac{4gd}{3C_d}\left(\frac{\rho_s - \rho}{\rho}\right)}$$

where
 d=diameter of the spherical object
 g=gravitational acceleration,
 $\rho$=density of the fluid,
 $\rho_s$=density of the object,
 A=$\pi d2/4$=projected area of the sphere,
 $C_d$=drag coefficient.

It is clear that for a given liquid and particle density, the terminal velocity is reduced with reducing particle diameter. This means that lowering a particle's size reduces the velocity difference between that particle and the transporting liquid, making the transport more efficient.

In turn, the polymer particle size is function of the original catalyst particle size in view of the replica phenomenon. Thus, this is the reason why it is desirable to have catalyst components with reduced particle size.

One way to prepare this kind of catalyst is to start from catalyst precursor already having small particle size.

$MgCl_2$.alcohol adducts and their use as catalyst precursors of catalyst components for the polymerization of olefins is well known in the art.

In WO98/44009 are disclosed $MgCl_2$.alcohol adducts having improved characteristics and characterized by a particular X-ray diffraction spectrum, in which, in the range of 2θ diffraction angles between 5° and 15°, the three main diffraction lines are present at diffraction angles 2θ of 8.8±0.2°, 9.4±0.2° and 9.8±0.2°, the most intense diffraction lines being the one at 2θ=8.8±0.2°, the intensity of the other two diffraction lines being at least 0.2 times the intensity of the most intense diffraction line. Said adducts can be of formula $MgCl_2 \cdot mEtOH \cdot nH_2O$ where m is between 2.2 and 3.8 and n is between 0.01 and 0.6. These adducts are obtained by specific preparation methods involving the reaction between $MgCl_2$ and alcohol under specific conditions such as long reaction times, absence of inert diluents or use of vaporized alcohol.

The molten adduct is then mixed with an oil immiscible with it, in order to create an emulsion which is subsequently quenched with cold liquid hydrocarbons.

The particle size of the adduct (precursor) is function of the energy provided to the emulsion system and, maintaining constant all the other features (shape of the tank and stirrer, type of oil) is inversely related to the intensity of stirring. Thus, in order to produce precursor with reduced particle size, higher amount of energy, in particular higher stirring, should be provided.

In alternative, as described in WO05/039745, can be used specific devices for preparing emulsions having the particles of the dispersed phase in suitable small size.

Both cases involve a complication of the process, and thus it would be advisable to find an easier way to have available catalyst precursors with reduced particle size.

In various catalyst precursor preparations involving magnesium chloride and alcohol such as EP-A-086288, non-ionic surfactants of the sorbitan stearate type have been used as dissolution aids for magnesium chloride. Their use in connection with the preparation of the magnesium chloride alcohol solid catalyst precursor however, does not affect the particle size obtainable. The applicant has now found that magnesium chloride-alcohol based adducts including specific amount of certain carboxylic acids, or their metal salts, can be obtained in smaller particle size using exactly the same conditions used for the preparation of the precursors without such carboxylic acids or their salts. Moreover, it has been found that said acids or their metal salts can also be effective in narrowing the particle size dispersion of the said adducts.

The present invention therefore relates to solid adducts comprising $MgCl_2$, an alcohol ROH in which R is a $C_1$-$C_{10}$ hydrocarbon group, present in a molar ratio with $MgCl_2$ ranging from 0.5 to 5 and less than 15% wt, based on the total weight of the adduct, of an aliphatic carboxylic acid having from 8 to 22 carbon atoms or of its metal salt.

Preferably, R is chosen among C1-C8 linear or branched hydrocarbon groups and more preferably among the C1-C4 linear hydrocarbon groups. Ethanol is especially preferred. Preferably, the number of moles of alcohol per mole of $MgCl_2$ ranges from 0.8 to 4 and more preferably from 1 to 3.5. The alcohol/Mg molar ratio from 1.5 to 3 is especially preferred.

The aliphatic carboxylic acid or the metal salt is preferably present in amounts ranging from 0.1 to less than 10% more preferably from 0.1 to less than 7% and especially in the range of from 0.3 to 5% wt based on the total weight of the adduct.

When a metal salt is used, it is preferably selected from metal salts in which the metal belong to Group 1-13 of the Periodic table of Elements (new notation). Among them, the preferred are Na, Li, K, Mg, Ca, Zn, Al with the Na, K, Mg and Al salts being the most preferred.

The aliphatic carboxylic acid and deriving metal salt is preferably selected from carboxylic acids having from C12-C20 carbon atoms, more preferably from C14-C20 carbon atoms. Among them, linear chain carboxylic acids are preferred. The acids can be either saturated or unsaturated. Non limitative examples are oleic acid, stearic acid, palmitic acid, linoleic acid and arachidonic acid. Specific metal salt examples are Mg stearate, Mg oleate, Mg palmitate, and the corresponding calcium, potassium, sodium, aluminum and zinc salts. Particularly preferred is Mg stearate which is commercially available. Also the acids are commercially available either pure or more commonly in form of mixtures in variable proportions. Particularly preferred are the commercially available mixtures of palmitic, stearic and oleic acids. The corresponding salts are also commercial but can also be obtained by saponification of the said acids.

The adduct or precursors of the present invention can be prepared according to different techniques. According to one method, the said adduct are obtained by adding to $MgCl_2$ and the alcohol less than 15% wt, based on the total weight of the adduct, of the above described acid or salt. The said method comprises bringing into contact the suitable amount of magnesium chloride, carboxylic acid (or its metal salt) and alcohol, heating the system until a molten adduct is formed and then rapidly cooling the system in order to solidify the particles preferably in spherical form.

The contact between magnesium chloride, carboxylic acid (metal salt) and alcohol can occur in the presence or in the absence of an inert liquid immiscible with and chemically inert to the molten adduct. If the inert liquid is present it is preferred that the desired amount of alcohol is added in vapor phase. This would ensure a better homogeneity of the formed adduct. The liquid in which the adduct is dispersed can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred. After the $MgCl_2$ particles, the alcohol and carboxylic acid metal salt are dispersed in the liquid phase the mixture is heated at a temperature at which the adduct reaches its molten state. This temperature depends on the composition of the adduct and generally ranges from 100 to 150° C. As mentioned before the temperature is kept at values such that the adduct is completely melted. Preferably the adduct is maintained in the molten state under stirring conditions, for a time period equal to or greater than 5 hours, preferably from 10 to 150 hours, more preferably from 20 to 100 hours.

In order to obtain solid discrete particles of the adduct with suitable morphology it is possible to operate in different ways. One of the preferred possibilities is the emulsification of the adduct in a liquid medium which is immiscible with and chemically inert to it followed (oily phase) by the quenching carried out by contacting the emulsion with an inert cooling liquid, thereby obtaining the solidification of the particles of the adduct in spherical form.

According to an alternative procedure, an already preformed $MgCl_2$-nROH adduct in which n is from 0.5 to 5 is contacted with the carboxylic acid (metal salt) in the presence of the oily phase immiscible with the adduct. The temperature is raised until the adduct is melted thereby obtaining two immiscible liquid phases. At this point the same quenching step with the cooling liquid described above can be carried out.

After solidification the particles can then be recovered, washed with hydrocarbon solvents and dried under vacuum.

It therefore constitutes another object of the invention a process for the preparation of solid adducts comprising $MgCl_2$ and an alcohol ROH in which R is a C1-C10 hydrocarbon group, present in a molar ratio with $MgCl_2$ ranging from 0.5 to 5, comprising:

contacting $MgCl_2$, the alcohol ROH and an aliphatic carboxylic acid having from 8 to 22 carbon atoms or of its metal salt in an amount of less than 15% based on the total weight of $MgCl_2$ and ROH and said acid or salt;

heating the system at a temperature such that a liquid phase is obtained comprising $MgCl_2$, alcohol and said acid or metal salt;

emulsifying said liquid phase in a liquid medium which is immiscible with it;

quenching the so obtained emulsion by contacting it with an inert cooling liquid thereby obtaining the solidification of the emulsified phase in spherical particles.

By way of these methods, it is possible to obtain adduct particles in spherical or spheroidal form. Such spherical particles have a ratio between maximum and minimum diameter lower than 1.5 and preferably lower than 1.3.

The adduct of the invention can be obtained in a broad range of particle size, namely ranging from 5 to 150 microns preferably from 10 to 100 microns and more preferably from 12 to 80 microns. While the specific particle dimension depends strictly on the energy provided during either the emulsifying step (extent of stirring) or the spraying step, it has been found that the use of the said carboxylic acid metal salt allows obtaining adduct particles having smaller particle size than the adduct not containing the carboxylic acid metal salt prepared under the same conditions. Such a particle size reduction, is not obtained using the non ionic surfactants known in the art.

It has been found that the adducts of the invention, particularly when prepared in the presence of carboxylic acids, may show for similar value of P50, a narrower particle size distribution (PSD) with respect to the adducts in which the said carboxylic acid is missing. The breath of the PDS can be calculated according to the formula $$\frac{P90 - P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value.

The adduct of the invention may also contain some water, preferably in an amount lower than 3% wt. The amount of water can be controlled by paying particular attention to the water content of the reactants. Both $MgCl_2$ and EtOH are in fact highly hygroscopic and tend to incorporate water in their structure. As a result, if the water content of the reactants is relatively high, the final $MgCl_2$-EtOH adducts may contain a too high water content even if water has not been added as a separate component. Means for controlling or lowering the water content in solids or fluids are well known in the art. The water content in $MgCl_2$ can be for example lowered by drying it in an oven at high temperatures or by reacting it with a compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves. Once this precautions have been taken, the reaction between the magnesium chloride the ethanol and the inorganic compounds to produce the adducts of the invention can be carried out according to the methods reported above.

The adducts of the invention are converted into catalyst components for the polymerization of olefins by reacting them with a transition metal compound of one of the groups IV to VI of the Periodic Table of Elements.

Among transition metal compounds particularly preferred are titanium compounds of formula $Ti(OR)_n X_{y-n}$ in which n is comprised between 0 and y; y is the valence of titanium; X is halogen and R is an alkyl radical having 1-8 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably the reaction is carried out by suspending the adduct in cold $TiCl_4$ (generally 0° C.); then the so obtained mixture is heated up to 80-130° C. and kept at this temperature for 0.5-2 hours. After that the excess of $TiCl_4$ is removed and the solid component is recovered. The treatment with $TiCl_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexyl-succinate, ethyl-benzoate and p-ethoxy ethyl-benzoate. Also the esters of diols disclosed in U.S. Pat. No. 7,388,061. Among this class, particularly preferred are the 2,4-pentanediol dibenzoate derivatives. Moreover, can be advantageously used also the 1,3 diethers of the formula:

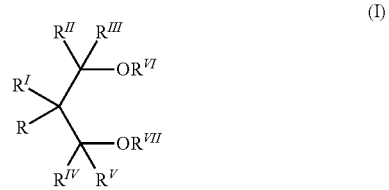

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R—$R^V$ except that they cannot be hydrogen; one or more of the R—$R^{VII}$ groups can be linked to form a cycle. The 1,3-diethers in which $R^{VI}$ and $R^V$ are selected from $C_1$-$C_4$ alkyl radicals are particularly preferred.

The electron donor compound is generally present in molar ratio with respect to the magnesium comprised between 1:4 and 1:60.

Preferably, the particles of the solid catalyst components have substantially the same size and morphology as the adducts of the invention generally comprised between 5 and 150 μm.

It has been noted that this preferred way of preparing the catalyst component leads to dissolution of the carboxylic acid metal salt in the liquid reagents and solvents and therefore it is no longer present in the final solid catalyst component.

Before the reaction with the transition metal compound, the adducts of the present invention can also be subjected to a dealcoholation treatment aimed at lowering the alcohol content and increasing the porosity of the adduct itself. The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of $MgCl_2$. After the dealcoholation treatment the adducts are reacted with the transition metal compound, according to the techniques described above, in order to obtain the solid catalyst components.

The solid catalyst components according to the present invention show a surface area (by B.E.T. method) generally between 10 and 500 m²/g and preferably between 20 and 350 m²/g, and a total porosity (by B.E.T. method) higher than 0.15 cm³/g preferably between 0.2 and 0.6 cm³/g.

The amount of the titanium compound in the final catalyst component ranges from 0.1 to 10% wt, preferably from 0.5 to 5% wt.

The catalyst components of the invention form catalysts for the polymerization of alpha-olefins $CH_2$=CHR, wherein R is hydrogen or a hydrocarbon radical having 1-12 carbon atoms, by reaction with Al-alkyl compounds. The alkyl-Al compound can be of the formula $AlR_{3-z}X_z$ above, in which R is a C1-C15 hydrocarbon alkyl radical, X is halogen preferably chlorine and z is a number 0≤z<3. The Al-alkyl compound is preferably chosen among the trialkyl aluminum compounds such as for example trimethylaluminum, triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 50 and 2000.

It is possible to use in the polymerization system an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the cyclic ethers such as tetrahydrofurane, and the 1,3 diethers having the previously described formula can be used as external donor.

As previously indicated the components of the invention and catalysts obtained therefrom find applications in the processes for the (co)polymerization of olefins of formula $CH_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

In particular, it has been noticed that the catalyst components obtained from the said adducts generate during polymerization polymer particles of smaller diameter which makes slurry process easier to be controlled.

The following examples are given to further illustrate without limiting in any way the invention itself.

Characterization

The properties reported below have been determined according to the following methods:

Fraction Soluble in Xylene. (XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Average Particle Size of the Adduct and Catalysts

Determined by a method based on the principle of the optical diffraction of monochromatic laser light with the "Malvern Instr. 2600" apparatus. The average size is given as P50. P10 and P90 are also determined with this method.

The particle size distribution (SPAN) is calculated with the formula $$\frac{P90 - P10}{P50}$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

Mastersizer 2000 particle size analyzer is normally divided into three units:

1) optical unit; Optical core unit suitable for measurements of solids of sizes ranging from 0.02 to 2000μ, equipped with two laser beam sources: red He/Ne laser, power 5 mw, wave length 633 nm., blue (diode) laser, wave length 450 nm.

2) sampling Unit; Hidro 2000S automatic Sampling Unit for volumes between 50 and 120 ml, operating with internal capacity, centrifuge pump, stirrer and ultrasound probe with 40 W power output.

3) PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

For the measurements n-heptane (plus 2 g/l antistatic Span 80) is used as dispersing agent.

Measuring cell is loaded with dispersing agent, while pump/agitator speed is set up to 2205 RPM. Background measurement is then taken. Then sample is loaded, by using a dedicated loading mean for solids or slurries. A that point, before being subject to PS Determination, the sample undergoes 30 seconds of Ultrasound treatment. After that, the measurement is taken.

Average Particle Size of the Polymers

Determined through the use Tyler Testing Sieve Shaker RX-29 Model B available from Combustion Engineering Endecott provided with a set of six sieves, according to ASTM E-11-87, of number 5, 7, 10, 18, 35, and 200 respectively.

Determination of Content of Metal Salt of Carboxylic Acids

Salts of metals different from Mg have been determined via the analysis of metal content through inductively coupled plasma emission spectroscopy on "I.C.P Spectrometer ARL Accuris".

The sample was prepared by analytically weighting, in a "fluxy platinum crucible", 0.1÷0.3 grams of catalyst and 3 grams of lithium metaborate/tetraborate 1/1 mixture (sodium tetraborate when Li stearate is used in the preparation of the adduct). The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then subject to ICP measurement.

From the metal content in the final solid and the initial amount and type of carboxylic acid metal salt used in preparation it is possible to calculate the recovery percentage and, in turn, the content of carboxylic acid metal salt in the solid.

When magnesium salt have been used the determination has been carried out via $^1H$ NMR spectra of the solid adducts obtained using a Bruker AV200 spectrometer operating in the Fourier transform mode at room temperature at 200.13 MHz.

The test is carried out on an addct sample which was treated from 60° C. to 150° C. (130° C. inner temperature) under vacuum under minimum nitrogen stream (0.2 bar residual vacuum) for 37 hrs, until a virtually complete removal of ethanol was reached and the concentration of aliphatic acid/salt is maximized. Then the dealcoholated precursor was dissolved in D-acetone and D-trifluoroacetic acid and analyzed for H-NMR.

EXAMPLES

Example 1

A 5 litre reactor was loaded with 557 g of anhydrous $MgCl_2$, 805 g of EtOH, and 6.8 g of Mg Stearate (Aldrich 26454 grade). The temperature was raised up to 125° C. and kept at this value for 8 hours. After that, the resulting melt was emulsified with ROL OB55 AT vaseline oil continuously introduced at 125° C. in an emulsifier, the stirring was brought to 2800 rpm and kept at that value for five minutes while continuously feeding the obtained emulsion into a stirred reactor containing cold hexane under stirring at 500 rpm.

The solid spherical catalyst precursor is then crystallized washed and dried, collecting a material having a composition of 0.45% Mg Stearate, 57.5% EtOH, 10.3% Mg, 30% Cl, 1.1% $H_2O$ and a P50 of 27.3 micron.

Example 2

The same procedure disclosed in example 1 was repeated with the difference that 652 g of anhydrous $MgCl_2$, 919 g of EtOH, and 23.6 g of Mg Stearate (Aldrich 26454 grade) were used. The solid spherical catalyst precursor which was collected had the following composition of 1.3% Mg Stearate, 57% EtOH, 10.3% Mg, 30.2% Cl, 0.8% $H_2O$ and a P50 of 23.8 micron.

Example 3

The same procedure disclosed in example 1 was repeated with the difference that 557 g of anhydrous $MgCl_2$, 805 g of EtOH, and 34 g of Mg Stearate (Aldrich 26454 grade) were used. The solid spherical catalyst precursor which was collected had the following composition of 2.4% Mg stearate, 55% EtOH, 10.3% Mg, 30.3% Cl, 1.3% $H_2O$ and a P50 of 21.9 micron.

Example 4

The same procedure disclosed in example 1 was repeated with the difference that 557 g of anhydrous $MgCl_2$, 805 g of EtOH, and 68 g of Mg Stearate (Aldrich 26454 grade) were used. The solid spherical catalyst precursor which was collected had the following composition of 55.3% EtOH, 10.2% Mg, 29.3% Cl, $H_2O$ 1.25%, stearate 4.0% and a P50 of 20.9 micron while the particle size distribution was 1.15.

Example 5

In a 250 cc cylindrical vessel equipped with a 4 pitched blade turbine 130 g of ROL OB 55AT oil, 30 g of an adduct $MgCl_2$/EtOH containing 57% wt of EtOH and 0.6 g of stearic acid were loaded at room temperature. The temperature was then raised up to 125° C. under stirring (200 RPM) and maintained at this level for 30 minutes. After this time the emulsion was transferred to a 3 L vessel equipped with a stirrer, operated at 500 RPM, containing 1.6 L of cold isohexane. After the transfer of the emulsion, the temperature in the vessel was raised up to room temperature in about 30 minutes and maintained for 2 hours. After this time the obtained solid was washed with fresh isohexane, dried and analyzed with a Malvern Mastersizer 2000. The particle size distribution showed a P50 of 40.3 microns and a particle size distribution of 1.48.

Example 6

The same procedure described in example 5 was followed with a different amount of stearic acid, 0.4 g instead of 0.6.

The particle size distribution of the obtained solid in this case had a P50 of 73.9 microns and a particle size distribution of 1.70.

Comparative Example 7

The same procedure disclosed in example 1 was repeated with the difference that the Mg stearate was not used. The solid spherical catalyst precursor which was collected had the following composition of 56.1% EtOH, 10.8% Mg, 31.2% Cl, 0.45% $H_2O$ and a P50 of 32.7 micron with a particle size distribution of 1.23.

Comparative Example 8

The same procedure disclosed in example 3 was repeated with the difference that the sorbitan stearate (SPAN 65) was used instead of Mg stearate: 653 g of anhydrous $MgCl_2$, 921 g of EtOH, and 39 g of SPAN 65 (Aldrich Sigma 85547). The solid spherical catalyst precursor which was collected had the following composition of 58.2% EtOH, 10.5% Mg, 30.6% Cl and a P50 of 34.8 micron.

Comparative Example 9

The preparation of a $MgCl_2$ based spherical precursor following the same procedure described in example 5 but without adding stearic acid led to the formation of a solid with a P50 of 83.1 micron with a particle size distribution of 1.77.

Example 10 and Comparative Example 11

Preparation of the Solid Catalyst Component

The precursors obtained in Example 4 and comparative example 7 were converted into catalyst components according to the following procedure.

Into a 2 litre steel reactor provided with stirrer, 1000 cm$^3$ of $TiCl_4$ at 0° C. were introduced; at room temperature and whilst stirring 30 g of the above adduct were introduced together with an amount of diisobutylphthalate (DIBP) as internal donor so as to give a Mg/donor molar ratio of 8. The whole was heated to 100° C. over 90 minutes and these conditions were maintained over 60 minutes. The stirring was stopped and after 15 minutes the liquid phase was separated from the settled solid maintaining the temperature at 100° C. A further treatments of the solid were carried out adding 1000 cm$^3$ of $TiCl_4$ and heating the mixture at 110° C. over 10 min. and maintaining said conditions for 30 min under stirring conditions (500 rpm). The stirring was then discontinued and after 15 minutes the liquid phase was separated from the settled solid maintaining the temperature at 110° C. Two further treatments of the solid were carried out adding 1000 cm$^3$ of $TiCl_4$ and heating the mixture at 120° C. over 10 min. and maintaining said conditions for 30 min under stirring conditions (500 rpm). The stirring was then discontinued and after 15 minutes the liquid phase was separated from the settled solid maintaining the temperature at 120° C. Thereafter, 3 washings with 1500 cm$^3$ of anhydrous hexane at 60° C. and 3 washings with 1000 cm$^3$ of anhydrous hexane at room temperature were carried out. The solid catalyst component obtained was then dried under vacuum in nitrogen environment at a temperature ranging from 40-45° C.

Propylene Polymerization Test

A 4 litre steel autoclave equipped with a stirrer, pressure gauge, thermometer, catalyst feeding system, monomer feeding lines and thermostatting jacket, was used. The reactor was charged with 0.01 gr. of solid catalyst component 0.76 g of PEAL, 0.06 g of cyclohexylmethyldimetoxy silane, 3.2 l of propylene, and 2.0 l of hydrogen. The system was heated to 70° C. over 10 min. under stirring, and maintained under these conditions for 120 min. At the end of the polymerization, the polymer was recovered by removing any unreacted monomers and was dried under vacuum. The results are reported in table 1.

Comparative Example 12

A 500 ml jacketed stirred reactor was loaded with 100 ml ROL OB55 AT oil and then with 99 g of anhydrous $MgCl_2$. Once that $MgCl_2$ crystals were homogeneously dispersed into the oil, so to achieve a better mixing and handling of exothermal behavior, 143 g of EtOH were rapidly loaded into the reactor under vigorous mixing. While the inner temperature naturally raised up from room temperature to about 80° C. as effect of exothermal reaction, the carefully plugged, jacketed reactor was warmed up to 125° C. so obtaining the melting of the $MgCl_2$-alcohol complex which was kept at this temperature for 5 hours. After that, the melt was quantitatively transferred to an emulsion stage already containing 1000 ml ROL OB55 AT oil at 125° C. (robust 3 lt reactors, having steel head holding in position a thin aluminum transfer pipe of 1.8 mm inner diameter). The melt was then emulsified with Vaseline oil by a stirrer operated at 1500 rpm for the time necessary to feed the emulsion to quenching stage (about 2-3 minutes). After 1 minute stirring, a nitrogen pressure (0.3 bar) was applied to the emulsion reactor so to achieve continuous transfer of the emulsified mixture through the thin pipe into a 10 liter reactor containing 7 liters of cold hexane at −7° C., so to obtain quenching of the molten material and achieve spheres solidification, without exceeding 0° C. The solid spherical catalyst precursor was then crystallized, washed and dried, collecting 88 grams of a material having the composition and size reported in Table 2.

Examples 13-20

All the test were carried out under the same conditions disclosed in Comparative example 11, with the difference that in addition to $MgCl_2$ and Ethanol, the amount of stearate derivative reported in Table 2 was also added. In the same Table are also reported the physical and chemical characteristics of the solid obtained.

The support prepared in examples 13-15, 19 and comp. Ex. 12 were used in the preparation of solid catalyst component according to the same procedure described in Ex. 10 and then used in the polymerization of propylene according to the general procedure. The results in terms of polymer average particle size (APS) are reported in table 3.

TABLE 1

| Example | Mg % wt | Ti % wt | DIBP % wt | P50 μm | Activity Kg/g | Xylene Insol. % wt | APS μm |
|---|---|---|---|---|---|---|---|
| 10 | 18 | 2.9 | 10.6 | 19.1 | 61.1 | 97.3 | 1130 |
| Comp. 11 | 19.4 | 2.9 | 10.8 | 33 | 60.6 | 97.1 | 1904 |

TABLE 2

| | Preparation | | Product characterization | | | | |
|---|---|---|---|---|---|---|---|
| Example | X g | X Type | Mg % wt | X % wt | EtOH % wt | P50 % wt | Span μm |
| Comp. 12 | — | — | 10.2 | — | 57.3 | 69.9 | 1.07 |
| 13 | 6.05 | Mg | 9.8 | 2.37 | 55.2 | 45.5 | 1.20 |
| 14 | 6.05 | Ca | 9.5 | 2.25 | 56.8 | 63.8 | 1.15 |
| 15 | 6.05 | $Al^3$d | 9.8 | 2.42 | 55.5 | 44.1 | 1.09 |
| 16 | 6.10 | $Al^3$t | 10.2 | 2.18 | 56.0 | 44.2 | 1.28 |
| 17 | 6.4 | Na | 9.9 | 2.37 | 54.5 | 38.2 | 1.3 |
| 18 | 6.6 | Zn | 10 | 2.39 | 56.1 | 52.2 | 1.02 |
| 19 | 6.05 | Li | 9.9 | 2.15 | 57.4 | 49.8 | 0.99 |
| 20 | 6.7 | K | 10 | 2.77 | 55.9 | 43.1 | 1.14 |

Mg = Magnesium stearate
Ca = Calcium stearate
$Al^3$d = Aluminum monohydroxy diestearate
$Al^3$t = Aluminum stearate
Na = sodium stearate
Zn = zinc stearate
Li = Lithium stearate
K = Potassium stearate

TABLE 3

| Example | Mg % wt | Ti % wt | DIBP % wt | P50 μm | APS μm |
|---|---|---|---|---|---|
| 13 | 19.8 | 2.7 | 11.3 | 39 | 1842 |
| 14 | 20.4 | 2.6 | 10.5 | 51 | 1865 |
| 15 | 19.7 | 3.1 | 11.1 | 41 | 1694 |
| 19 | 17.2 | 2.2 | n.a. | 41 | 1783 |
| Comp. 12 | 19.2 | 2.5 | 10.2 | 67 | 2575 |

The invention claimed is:

1. A solid adduct comprising:
    $MgCl_2$,
    an alcohol ROH in which R is a $C_1$-$C_{10}$ hydrocarbon group, present in a molar ratio with $MgCl_2$ ranging from 0.5 to 5, and
    an aliphatic carboxylic acid having from 8 to 22 carbon atoms or its metal salt present in an amount of less than 15 wt %, based on the total weight of the adduct.

2. The solid adduct according to claim 1 in which R is chosen among $C_1$-$C_8$ linear or branched hydrocarbon groups.

3. The solid adduct according to claim 1 in which the number of moles of alcohol per mole of $MgCl_2$ ranges from 0.8 to 4.

4. The solid adduct according to claim 1 containing the aliphatic carboxylic acid or the metal salt in an amount ranging from 0.1 to less than 10 wt %.

5. The solid adduct according to claim 1 in which the aliphatic carboxylic acid or its metal salt is selected from carboxylic acids having from $C_{12}$-$C_{20}$ carbon atoms.

6. The solid adduct according to claim 1 in which the metal of the salt is selected Na, Li, K, Mg, Ca, Zn, and Al.

7. The solid adduct according to claim 6 in which the metal is selected from Na, K, Mg and Al.

8. The solid adduct according to claim 1 in which the aliphatic carboxylic acid is selected from linear chain carboxylic acids.

9. The solid adduct according to claim 1 in which the metal salt of the aliphatic carboxylic acid is selected from Mg stearate, Mg oleate, Mg palmitate.

10. The solid adduct according to claim 1 which are in spherical or spheroidal form.

11. A process for the preparation of solid adducts comprising $MgCl_2$ and an alcohol ROH in which R is a $C_1$l-$C_{10}$ hydrocarbon group, present in a molar ratio with $MgCl_2$ ranging from 0.5 to 5, comprising:

contacting $MgCl_2$, the alcohol ROH and an aliphatic carboxylic acid having from 8 to 22 carbon atoms or its metal salt in an amount of less than 15% based on the total weight of $MgCl_2$ and ROH and said acid or salt;

heating the system at a temperature such that a liquid phase is obtained comprising $MgCl_2$, alcohol and said acid or metal salt;

emulsifying said liquid phase in a liquid medium which is immiscible with the liquid phase;

quenching the so obtained emulsion by contacting it with an inert cooling liquid thereby solidifying the emulsified phase into spherical particles.

12. The process according to claim 11 in which the aliphatic carboxylic acid or the metal salt is used in an amount ranging from 0.1 to less than 10 wt % based on the total weight of the adduct and it is selected from carboxylic acids having from $C_{12}$-$C_{20}$ carbon atoms.

13. A catalyst component for the polymerization of olefins obtained by reacting the adduct of claim 1 with a transition metal compound of one of the groups IV to VI of the Periodic Table of Elements.

14. A catalyst for the polymerization of alpha-olefins $CH_2$=CHR, wherein R is hydrogen or a hydrocarbon radical having 1-12 carbon atoms, obtained by reacting the catalyst component of claim 13 with an Al-alkyl compound optionally in the presence of an external electron donor compound.

15. A process for the polymerization of olefins comprising polymerizing olefins in the presence of the catalyst of claim 14.

\* \* \* \* \*